US011465569B2

(12) United States Patent
Grünig et al.

(10) Patent No.: US 11,465,569 B2
(45) Date of Patent: Oct. 11, 2022

(54) SUPPORT FOR A CAMERA ON A MOTOR VEHICLE

(71) Applicant: CONTINENTAL AUTOMOTIVE GMBH, Hannover (DE)

(72) Inventors: Thomas Grünig, Schwalbach a. Ts. (DE); Sebastian Wehl, Schwalbach a. Ts. (DE)

(73) Assignee: Continental Automotive GmbH

( * ) Notice: Subject to any disclaimer, the term of this patent is extended or adjusted under 35 U.S.C. 154(b) by 22 days.

(21) Appl. No.: 17/116,388

(22) Filed: Dec. 9, 2020

(65) Prior Publication Data

US 2021/0086706 A1 Mar. 25, 2021

Related U.S. Application Data

(63) Continuation of application No. PCT/EP2019/064913, filed on Jun. 7, 2019.

(30) Foreign Application Priority Data

Jun. 11, 2018 (DE) ...................... 10 2018 209 288.5

(51) Int. Cl.
*B60R 11/04* (2006.01)
*H04N 5/225* (2006.01)
(Continued)

(52) U.S. Cl.
CPC ............ *B60R 11/04* (2013.01); *B60R 1/0617* (2013.01); *B60R 1/076* (2013.01); *H04N 5/2252* (2013.01);
(Continued)

(58) Field of Classification Search
CPC ....... B60R 1/0617; B60R 1/076; B60R 11/04; B60R 2011/0082; B60R 2300/8046; H04N 5/2252
(Continued)

(56) References Cited

U.S. PATENT DOCUMENTS

2012/0293656 A1 11/2012 Schuetz
2012/0315027 A1* 12/2012 Schutz .................... B60R 11/04
396/419

(Continued)

FOREIGN PATENT DOCUMENTS

DE 3923922 A1 1/1991
DE 102012015395 B3 11/2013
(Continued)

OTHER PUBLICATIONS

International Search Report and Written Opinion dated Aug. 22, 2019 from corresponding International Patent Application No. PCT/EP2019/064913.
(Continued)

*Primary Examiner* — Christopher S Kelley
*Assistant Examiner* — Kathleen M Walsh

(57) ABSTRACT

A support for a camera on a motor vehicle, including at least a main body with a guide and a bracket element which is pivotable relative to the main body and is connected to the main body via at least one guide rail, and which extends along an extent between a first end and a second end, wherein the camera may be arranged on the second end, wherein the first end is arranged on the guide, wherein the bracket element is pivotably connected to the at least one guide rail between the first end and the second end, and wherein, when the bracket element is pivoted, the first end is displaceable along the guide and the bracket element is displaceable along the at least one guide rail.

10 Claims, 4 Drawing Sheets

(51) Int. Cl.
  *B60R 1/06* (2006.01)
  *B60R 1/076* (2006.01)
  *B60R 11/00* (2006.01)

(52) U.S. Cl.
  CPC ............... *B60R 2011/0082* (2013.01); *B60R 2300/8046* (2013.01)

(58) Field of Classification Search
  USPC ........................................... 348/148
  See application file for complete search history.

(56) References Cited

U.S. PATENT DOCUMENTS

| | | | | |
|---|---|---|---|---|
| 2014/0043528 | A1* | 2/2014 | Barthel | B60R 11/04 348/373 |
| 2014/0197649 | A1* | 7/2014 | Hansen | B60R 11/04 396/428 |
| 2017/0136963 | A1* | 5/2017 | Carson | G03B 17/04 |
| 2018/0195317 | A1* | 7/2018 | Okuma | G03B 17/04 |
| 2018/0272958 | A1* | 9/2018 | Brouwer | B60S 1/56 |
| 2019/0118728 | A1* | 4/2019 | Oba | B60R 1/00 |
| 2019/0152402 | A1* | 5/2019 | Dornik | B60J 3/0278 |
| 2019/0306466 | A1* | 10/2019 | Herrmann | B60R 1/006 |
| 2020/0317142 | A1 | 10/2020 | Miethig | |
| 2021/0024011 | A1 | 1/2021 | Sakata | |

FOREIGN PATENT DOCUMENTS

| | | |
|---|---|---|
| DE | 102017001122 B3 | 2/2018 |
| JP | 2014231333 A | 12/2014 |
| JP | 2017171137 A | 9/2017 |
| JP | 2017208781 A | 11/2017 |
| JP | 2019026161 A | 2/2019 |
| JP | 2021508301 A | 3/2021 |
| WO | 2011086131 A1 | 7/2011 |
| WO | 2017164067 A1 | 9/2017 |

OTHER PUBLICATIONS

German Office Action dated Apr. 11, 2018 for corresponding German Patent Application No. 10 2018 209 288.5.
Office Action dated Dec. 6, 2021 from corresponding Japanese patent application No. JP 2020-568676.

* cited by examiner

SUPPORT FOR A CAMERA ON A MOTOR VEHICLE

CROSS REFERENCE TO RELATED APPLICATIONS

This application claims the benefit of PCT Application PCT/EP2019/064913, filed Jun. 7, 2019, which claims priority to German Application DE 10 2018 209 288.5, filed Jun. 11, 2018. The disclosures of the above applications are incorporated herein by reference.

FIELD OF INVENTION

The invention concerns a support for a camera for a motor vehicle. In particular, the camera arranged on the support is intended for detecting an image region located outside the motor vehicle. In particular, the camera is intended as a replacement for known side mirrors of a motor vehicle.

BACKGROUND

Side mirrors for motor vehicles are known which can be rotated relative to the bodywork of the motor vehicle in order to detect an image region which can be set individually.

Cameras are also known which can be arranged on the bodywork via supports. Usually, the cameras are attached to the bodywork via rigid supports.

DE 10 2012 015 395 B3 describes a folding camera arm for a motor vehicle.

In operation of the motor vehicle, contact between the support or camera and other objects arranged outside the motor vehicle (other motor vehicles or persons) may damage the support or the camera. If the camera is arranged rigidly, it is also possible that the other objects may be damaged.

SUMMARY

Example embodiments of the present disclosure at least partially solve the problems outlined with respect to the prior art. In particular, a support is proposed which is at least partially movable relative to the bodywork.

A support for a camera (alternatively or additionally, for sensors) on a motor vehicle is proposed. The support has at least one main body with a guide and a bracket element which is pivotable relative to the main body and connected to the main body via at least one guide rail. The bracket element extends along an extent between a first end and a second end. The camera may be or is arranged at the second end. The first end is arranged at the guide. The bracket element is pivotably connected to the at least one guide rail between the first end and the second end. When the bracket element is pivoted, the first end is displaceable along the guide and the bracket element is displaceable along the guide rail (relative to the main body).

The support may in particular be arranged on a bodywork of a motor vehicle via the main body. The at least one guide rail is in particular connected fixedly to the main body or bodywork, wherein the bracket element is displaceable along the guide rail and movable relative to the bodywork.

In particular, during pivoting, the bracket element moves relative to the main body or relative to the at least one guide rail, and during displacement, it moves along the at least one guide rail in a common plane.

In particular, the guide and the at least one guide rail are arranged stationarily relative to each other.

In one aspect, the bracket element is mounted rotatably on the at least one guide rail via a peg. In particular, the bracket element is guided along the at least one guide rail via the peg.

In particular, the bracket element is pivotable relative to the peg. In particular, the peg is arranged displaceably in the guide rail. In particular, the peg is arranged rotatably relative to the guide rail. Alternatively, the peg is not rotatable relative to the guide rail.

In particular, the bracket element is connected to the main body via at least one spring element. In particular, the peg, via which the bracket element is mounted rotatably on the at least one guide rail, is connected to the main body via the spring element.

In one aspect, the at least one spring element is a tension spring. In some cases, several spring elements may also be provided.

In particular, in a starting position of the bracket element, the first end is arranged in a latching position of the guide. The latching position is formed for example by a depression in the guide, in which a latching lug of the bracket element is arranged.

In one aspect, the guide has a sliding region adjacent to the latching position, wherein the latching position is configured such that a first force is required to move the bracket element along the sliding region, wherein a second force is required to move the bracket element out of the latching position. The first force is smaller than the second force.

In particular, the bracket element is connected to the main body via a spring element, wherein the spring element is deflected to a maximum when the bracket element is in the starting position. As the bracket element pivots further relative to the starting position, the deflection of the spring element is increasingly reduced.

In particular, the pivoting of the bracket element may be supported by the spring element, or caused by the spring element (after the bracket element has been pivoted out of the latching position).

In particular, the first end is formed by a rotatable element so that when the bracket element is pivoted, the element rolls along the guide. The rotatable element may be formed e.g. by a cylindrical body which forms part of the otherwise rigid bracket element. A rotational axis of the rotatable element is in particular arranged parallel to an axis of pivoting of the bracket element.

In particular, the rotatable element may be driven via a drive element (e.g. a gearwheel or similar) of the support in order to pivot the bracket element. The drive element is arranged for example on the main body. In particular, the drive element may be driven via an electric motor.

In particular, the first end—or the first end configured as a rotatable element—may be connected to the main body via at least one holder. In particular, the first end may thus be guided by the holder along the guide on the main body.

In particular, the support has a first guide rail and a second guide rail. The guide rails run in particular parallel to each other, wherein the bracket element is arranged between the guide rails.

Furthermore, a motor vehicle is provided having at least a bodywork and the described support which is arranged on the bodywork.

In particular, the support is arranged on a side of the motor vehicle. In one aspect, the bracket element can be displaced along the at least one guide rail substantially parallel to a plane defined by all wheel hubs of the motor vehicle.

The orientation of the guide rail and bracket element relative to each other as proposed herein allows, for example, the bracket element to be displaced along the guide rail on rotation of the bracket element (caused e.g. by contact with an object).

The statements with respect to the support may be transferred in particular to the motor vehicle, and vice versa.

As a precaution, it is pointed out that the numerical terms used here ("first", "second" etc.) serve primarily (merely) to distinguish between several similar objects, sizes or processes, i.e. in particular they do not prescriptively impose any dependency and/or order of these objects, sizes or processes relative to each other. If a dependency and/or order is necessary, this is explicitly indicated or will be evident to the person skilled in the art studying the specific embodiment described.

BRIEF DESCRIPTION OF THE DRAWINGS

The invention and the technical field will be explained in more detail below on the basis of the attached figures. It is pointed out that the invention is not restricted by the example embodiments described. In particular, unless explicitly indicated otherwise, it is also possible to extract partial aspects of the situations explained in the figures and combine these with other constituents and knowledge from the present description. In particular, it should be noted that the figures and in particular the illustrated proportions are merely schematic. The drawings show.

DETAILED DESCRIPTION

Figure 1:
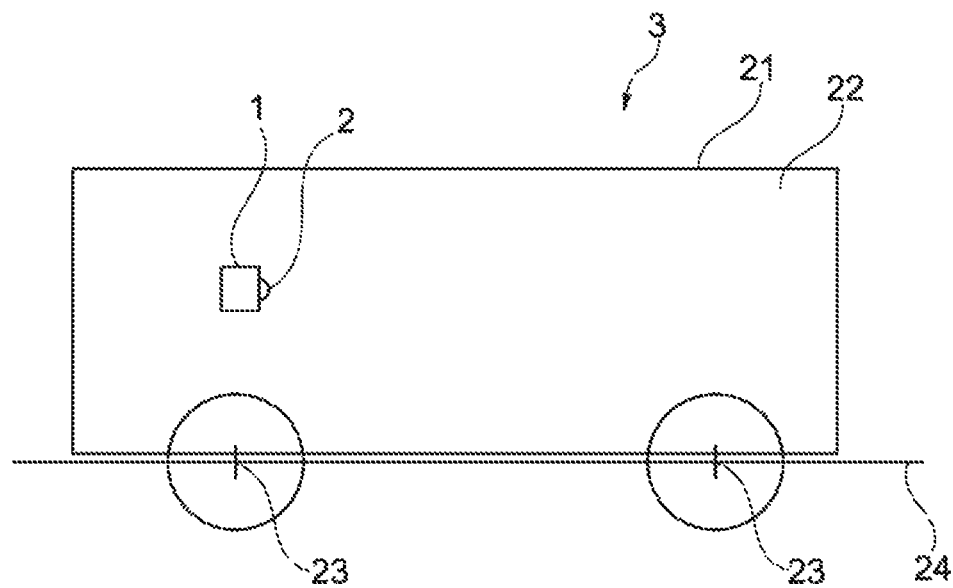
FIG. 1: a motor vehicle in a side view.

FIG. 1 shows a motor vehicle 3 in a side view. The motor vehicle 3 includes a bodywork 23 with support 1 attached thereto. The support 1 is arranged on a side 22 of the motor vehicle 3. The bracket element 4 can be displaced along the guide rail 5, 6 substantially parallel to a plane 24 defined by all wheel hubs 23 of the motor vehicle 3.

Figure 2:
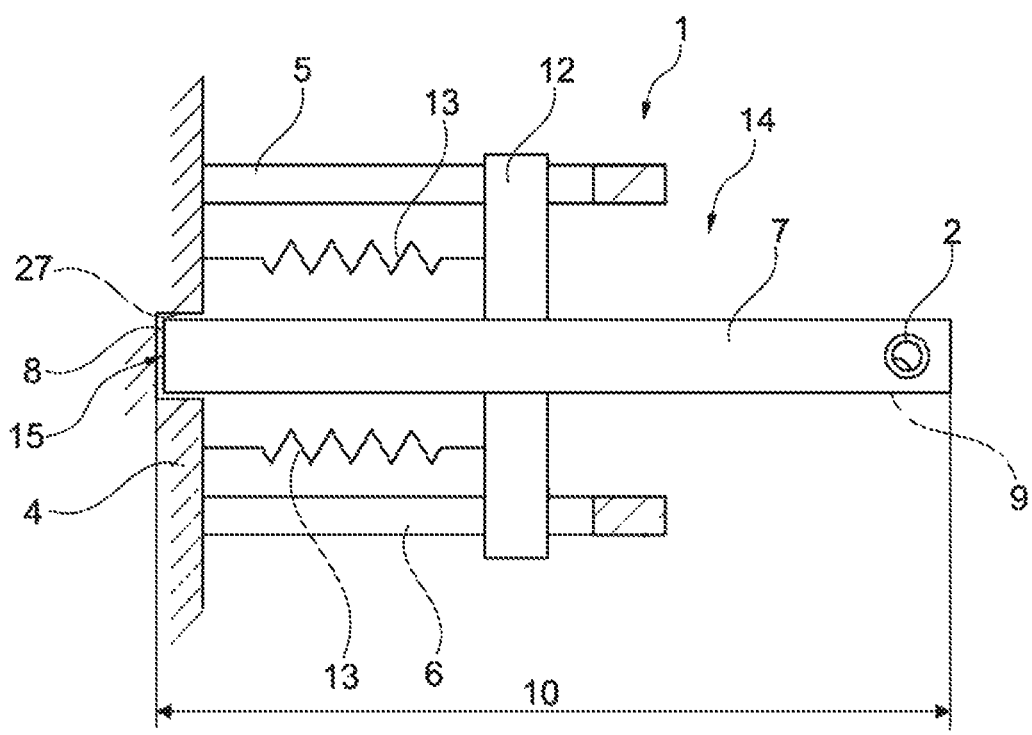
FIG. 2: a first embodiment variant of a support in a side view.
Figure 3:
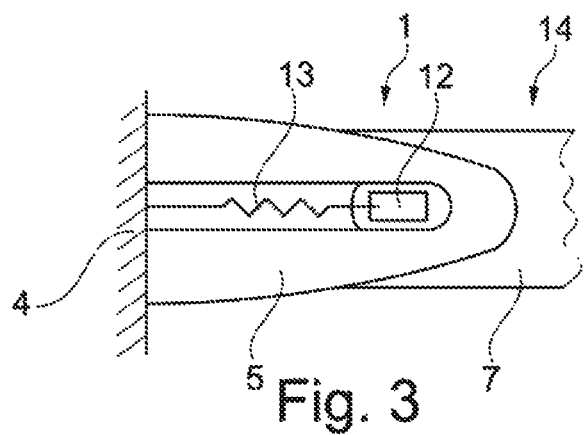
FIG. 3: the support from FIG. 2 in a top view.
Figure 4:
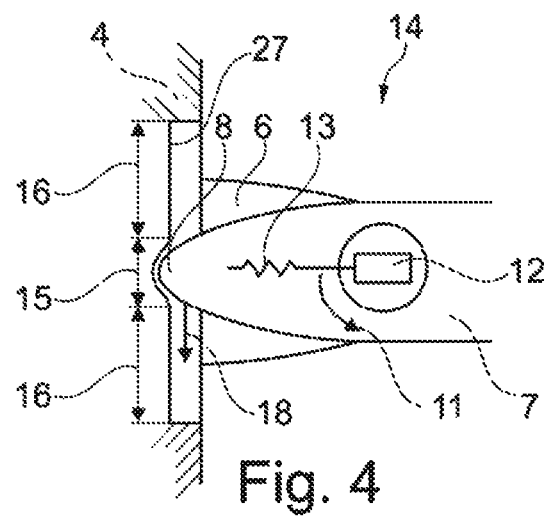
FIG. 4: the support from FIG. 3 in a sectional top view, in a starting position.
Figure 5:
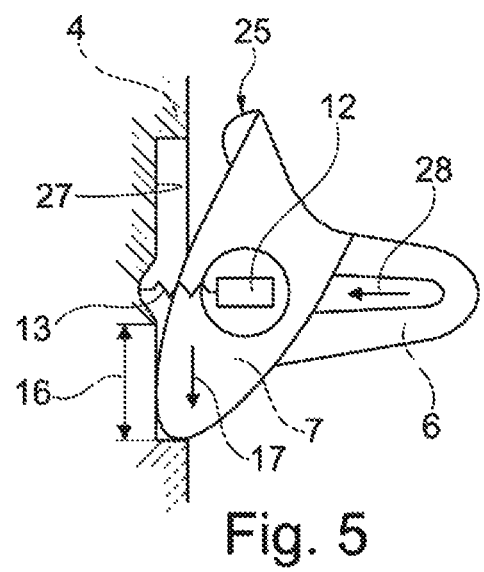
FIG. 5: the support from FIG. 4 after pivoting of the bracket element.

FIG. 2 shows a side view of a first embodiment variant of a support 1. FIG. 3 shows the support 1 from FIG. 2 in a top view. FIG. 4 shows the support 1 from FIG. 3 in a sectional top view, in a starting position 14. FIG. 5 shows the support 1 from FIG. 4 after pivoting 11 of the bracket element 7. FIGS. 2 to 5 are described jointly below. Reference is made to the statements relating to FIG. 1.

The support 1 has at least one main body 4 with a guide 27 and a bracket element 7 which is pivotable relative to the main body 4 and connected to the main body 4 via the first guide rail 5 and the second guide rail 6. The bracket element 7 extends along an extent 10 between a first end 8 and a second end 9. The camera 2 is arranged on the second end 9. The first end 8 is arranged on the guide 27. The bracket element 7 is connected pivotably to the guide rails 5, 6 between the first end 8 and the second end 9. When the bracket element 7 is pivoted 11, the first end 8 is displaceable along the guide 27 and the bracket element 7 is displaceable along the guide rails 5, 6 (relative to the main body 4).

The support element 7 is mounted rotatably on the guide rails 5, 6 via a peg 12. The support element 7 is guided along the guide rails 5, 6 via the peg 12. The peg 12 and hence the bracket element 7 are moved (transversely) relative to the guide rails 5, 6 by the displacement amount 28 when the bracket element 7 is pivoted 11.

The bracket element 7 is here pivotable relative to the peg 12. The peg 12 is displaceable in the guide rails 5, 6 but is not rotatable relative to the guide rails 5, 6.

The bracket element 7 is connected to the main body 4 via a spring element 13. In the present case, the peg 12, via which the bracket element 7 is mounted rotatably on the guide rails 5, 6, is connected to the main body 4 via the spring element 13.

The spring element 13 is a tension spring. The spring element 13 is deflected to a maximum when the bracket element 7 is in the starting position 14. As the bracket element 7 pivots 11 further relative to the starting position 14, the deflection of the spring element 13 is increasingly reduced. The pivoting 11 of the bracket element 7 is supported by the spring element 13 or is caused thereby (after the bracket element 7 has pivoted 11 out of the latching position 15).

The first end 8 is arranged in a latching position 15 of the guide 27 when the bracket element 7 is in a starting position 14 (see FIG. 4). The latching position 15 is formed for example by a depression in the guide 27, in which a latching lug of the bracket element 7 is arranged.

The guide 27 has a sliding region 16 adjacent to the latching position 15, wherein the latching position 15 is configured such that a first force 17 is required to move the bracket element 7 along the sliding region 16 (see FIG. 5, at least until the end position shown is reached), wherein a second force 18 is required to move the bracket element 7 out of the latching position 15 (see FIG. 4).

The pivoting 11 of the bracket element 7 may be limited via a damper 25 which is arranged on the bracket element 7 (alternatively or additionally, may be arranged on the main body 4) and cooperates with the main body 4 (see FIG. 5).

Figure 6:
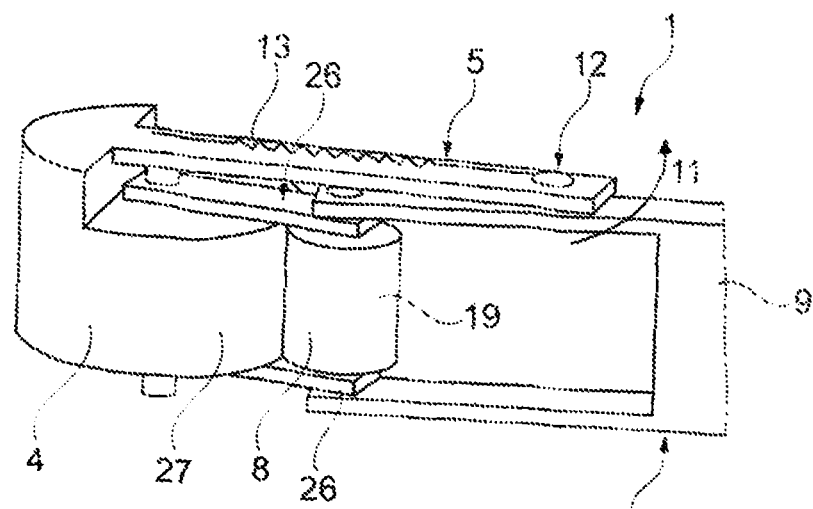
FIG. 6: a second embodiment variant of a support in a perspective view.
Figure 7:
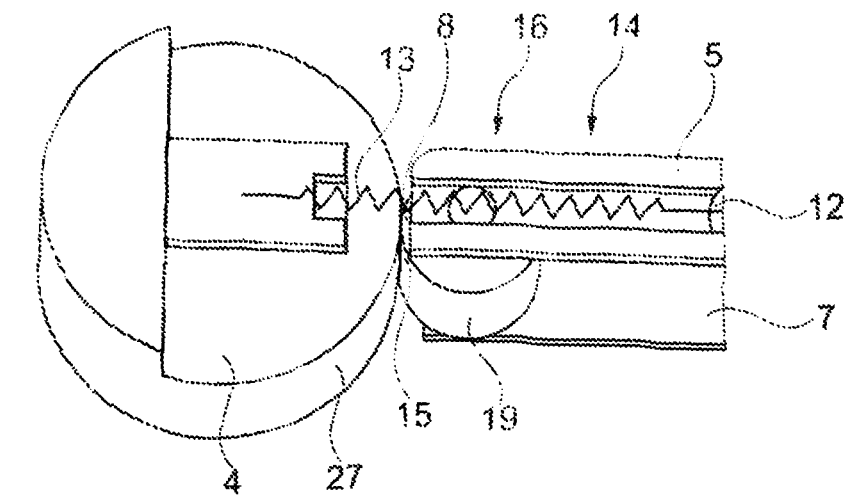
FIG. 7: the support from FIG. 6 in a perspective view, in a starting position.

FIG. 6 shows a perspective view of a second embodiment variant of the support 1. FIG. 7 shows the support 1 from FIG. 6 in a perspective view, in a starting position 14. FIGS. 6 and 7 are described jointly below. Reference is made to the statements concerning FIGS. 2 to 5.

In contrast to the first embodiment variant, the first end 8 of the bracket element 7 is formed by a rotatable element 19 so that on pivoting of the bracket element 7, the element 19 rolls along the guide 27. The rotatable element may be formed e.g. by a cylindrical body which forms part of the otherwise rigid bracket element 7. A rotational axis of the rotatable element 19 is in particular arranged parallel to an axis of pivoting 11 of the bracket element 7. The first end 8 configured as a rotatable element 19 is here connected to the main body 4 via a respective holder 26. The first end 8 may thus be guided by the holder 26 along the guide 27 on the main body 4.

Figure 8:
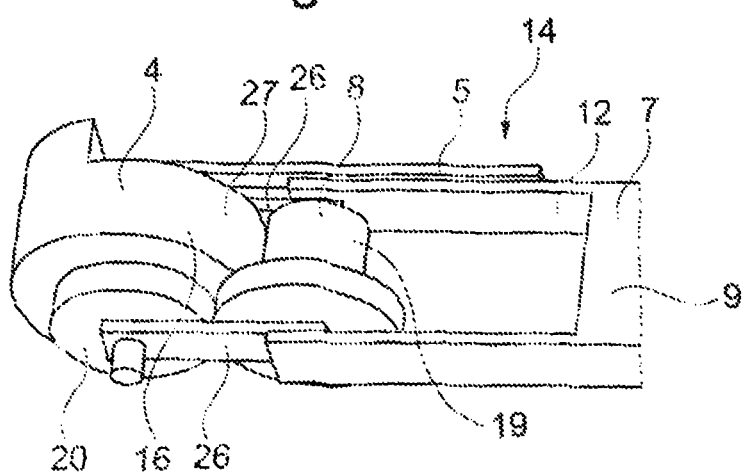
FIG. 8: a third embodiment variant of a support in a perspective view.

FIG. 8 shows in a perspective view a third embodiment variant of a support 1 (which is configured in particular to be suitable for a motorized drive). Reference is made to the statements relating to FIGS. 6 and 7.

In contrast to the second embodiment variant, the rotatable element 19 may be driven via a drive element 20 (e.g. a gearwheel or similar) of the support 1, in order to pivot the bracket element 7. The drive element 20 is arranged on the main body 4.

Figure 9:
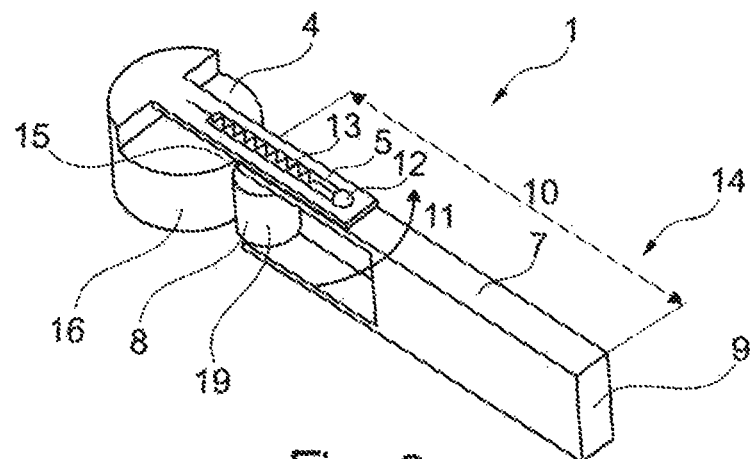
FIG. 9: the support according to the second embodiment variant in a perspective view, in a starting position.
Figure 10:
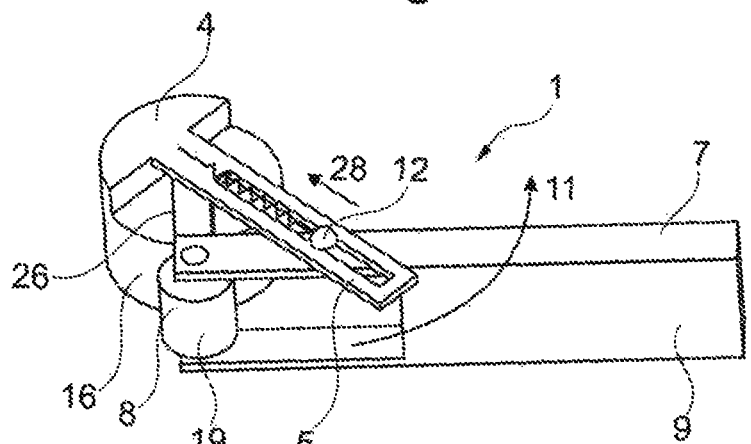
FIG. 10: the support from FIG. 9 during pivoting of the bracket element.
Figure 11:
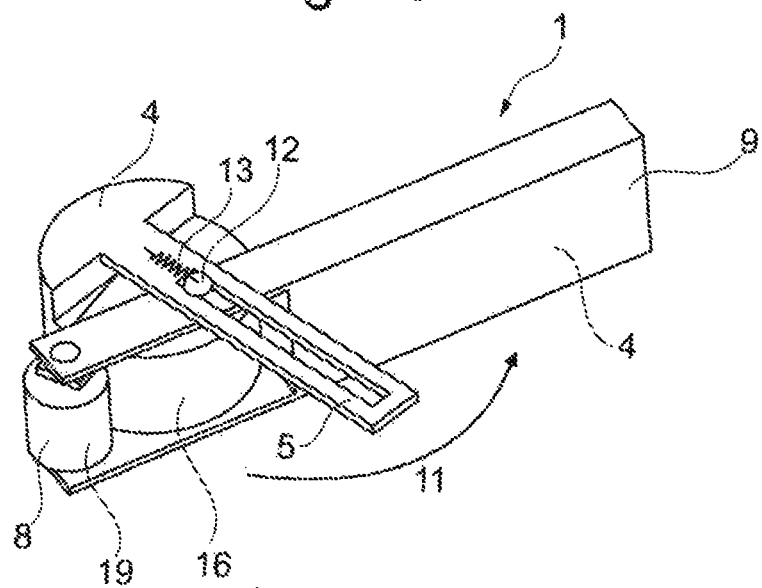
FIG. 11: the support from FIGS. 9 and 10 in the fully pivoted position.

FIG. 9 shows the support 1 in the second embodiment variant in a perspective view, in a starting position 14. FIG. 10 shows the support 1 from FIG. 9 during pivoting 11 of the bracket element 7. FIG. 11 shows the support 1 from FIGS. 9 and 10 in the fully pivoted position. FIG. 9 to are described jointly below. Reference is made to the statements relating to FIGS. 6 and 7.

In the starting position 14, the first end 8 (here the rotatable element 19) is arranged in a latching position 15 of the guide 27. In the partly pivoted position (FIG. 10), the first end 8 is situated in the sliding region 16 of the guide 27. The first end 8 is guided relative to the main body 4 via a holder 26. The peg 12 and the bracket element 7 are displaced by the displacement amount 28 along the first guide rail 5. In the fully pivoted position (FIG. 11), the peg 12 is displaced relative to the first guide rail 5 so far that it is arranged in the region of the main body 4.

The invention claimed is:

1. A support for a camera on a motor vehicle, comprising at least a main body with a guide and a bracket element which is pivotable relative to the main body, is connected to the main body via at least one guide rail, and which extends along an extent between a first end and a second end, wherein the guide and the at least one guide rail are arranged stationarily relative to each other, wherein the camera is arranged on the second end, wherein the first end is arranged on the guide, wherein the bracket element is pivotably connected to the at least one guide rail between the first end and the second end, and wherein, when the bracket element is pivoted, the first end is displaceable along the guide and the bracket element is displaceable along the at least one guide rail.

2. The support as claimed in claim 1, further comprising a peg, wherein the bracket element is rotatably mounted on the at least one guide rail via the peg.

3. The support as claimed in claim 1, further comprising at least one spring element, wherein the bracket element is connected to the main body via the at least one spring element.

4. A support for a camera on a motor vehicle, comprising at least a main body with a guide and a bracket element which is pivotable relative to the main body, is connected to the main body via at least one guide rail and a spring element, and which extends along an extent between a first end and a second end, wherein in a starting position of the bracket element, the first end is arranged in a latching position of the guide, wherein the spring element is deflected to a maximum when the bracket element is in the starting position, wherein the camera is arranged on the second end, wherein the first end is arranged on the guide, wherein the bracket element is pivotably connected to the at least one guide rail between the first end and the second end, and wherein, when the bracket element is pivoted, the first end is displaceable along the guide and the bracket element is displaceable along the at least one guide rail.

5. The support as claimed in claim 4, wherein the guide has a sliding region adjacent to the latching position, wherein the latching position is configured such that a first force is required to move the bracket element along the sliding region, wherein a second force is required to move the bracket element out of the latching position, and wherein the first force is smaller than the second force.

6. The support as claimed in claim 1, wherein the first end is rotatable along the guide.

7. The support as claimed in claim 6, further comprising a gearwheel, wherein the the gearwheel is arranged on the main body.

8. The support as claimed in claim, 1 wherein the at least one guide rail comprises a first guide rail and a second guide rail.

9. A motor vehicle having at least a bodywork and a support as claimed in claim 1, arranged on the bodywork.

10. The motor vehicle as claimed in claim 9, wherein the support is arranged on a side of the motor vehicle, and wherein the bracket element is displaceable along the at least one guide rail substantially parallel to a plane defined by all wheel hubs of the motor vehicle.

* * * * *